(12) United States Patent
Rosenstern (10) Patent No.: US 9,739,147 B2
(45) Date of Patent: Aug. 22, 2017

(54) PROXIMITY DETECTION SYSTEMS AND METHODS

(71) Applicant: Joy MM Delaware, Inc., Wilmington, DE (US)

(72) Inventor: Philip Rosenstern, Aliquippa, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 15/189,932

(22) Filed: Jun. 22, 2016

(65) Prior Publication Data

US 2016/0369630 A1  Dec. 22, 2016

Related U.S. Application Data

(63) Continuation of application No. 14/473,297, filed on Aug. 29, 2014, now Pat. No. 9,404,363.

(Continued)

(51) Int. Cl.
*G08B 21/02* (2006.01)
*E21F 17/18* (2006.01)
(Continued)

(52) U.S. Cl.
CPC ............ *E21F 17/18* (2013.01); *E21C 35/04* (2013.01); *G01S 13/58* (2013.01); *G01S 13/723* (2013.01);
(Continued)

(58) Field of Classification Search
CPC .......... F16P 3/141; F16P 3/147; G08B 21/00; G08B 21/02; G08B 21/22; G08B 21/0213; G08B 25/016; G08G 1/0962; B66F 17/003; G01V 15/00

USPC ... 340/539.1, 539.11, 539.13, 539.23, 572.1, 340/572.4, 573.4, 669, 686.1, 825.49, 340/825.69; 342/422; 343/834
See application file for complete search history.

(56) References Cited

U.S. PATENT DOCUMENTS 6,677,917 B2  1/2004  Van Heerden et al.
6,784,800 B2  8/2004  Orzechowski
(Continued)

FOREIGN PATENT DOCUMENTS

KR  20130086742 A  8/2013

OTHER PUBLICATIONS

PCT/US2014/053464 International Search Report and Written Opinion dated Dec. 24, 2014 (14 pages).

*Primary Examiner* — Hung T Nguyen
(74) *Attorney, Agent, or Firm* — Michael Best & Friedrich LLP (57) ABSTRACT

Methods and systems for detecting a person located around a piece of equipment. One system includes processor configured to define a first virtual zone around a piece of equipment, determine a location of a person, and define a second virtual zone around the person at the location. As the location of the person changes, the processor is further configured to determine a direction of travel of the person, and automatically modify the second virtual zone to extend a first distance in the direction of travel of the person and extend in a second distance opposite the direction, wherein the first distance is greater than the second distance. In response to at least a portion of the second virtual zone overlapping with at least a portion of the first virtual zone, the processor is configured to perform at least one action.

20 Claims, 5 Drawing Sheets

Related U.S. Application Data (60) Provisional application No. 61/872,293, filed on Aug. 30, 2013.

(51) Int. Cl.
| | |
|---|---|
| *E21C 35/04* | (2006.01) |
| *G01S 13/74* | (2006.01) |
| *G01S 17/58* | (2006.01) |
| *G01S 17/66* | (2006.01) |
| *G01S 17/88* | (2006.01) |
| *G01S 13/58* | (2006.01) |
| *G01S 13/72* | (2006.01) |
| *G01S 13/88* | (2006.01) |
| *G01S 15/58* | (2006.01) |
| *G01S 15/66* | (2006.01) |
| *G01S 15/88* | (2006.01) |
| *F16P 3/14* | (2006.01) |
| *H04W 4/02* | (2009.01) |

(52) U.S. Cl.
CPC .............. *G01S 13/74* (2013.01); *G01S 13/88* (2013.01); *G01S 15/58* (2013.01); *G01S 15/66* (2013.01); *G01S 15/88* (2013.01); *G01S 17/58* (2013.01); *G01S 17/66* (2013.01); *G01S 17/88* (2013.01); *G08B 21/02* (2013.01); *F16P 3/14* (2013.01); *H04W 4/021* (2013.01); *H04W 4/027* (2013.01)

(56) References Cited

U.S. PATENT DOCUMENTS

| | | | |
|---|---|---|---|
| 7,002,526 | B1 | 2/2006 | Adams et al. |
| 8,115,650 | B2 | 2/2012 | Dasilva et al. |
| 8,289,170 | B2 | 10/2012 | Pryor et al. |
| 8,446,277 | B2 | 5/2013 | Frederick |
| 9,404,363 | B2 | 8/2016 | Rosenstern |
| 2002/0190849 | A1 | 12/2002 | Orzechowski |
| 2006/0087443 | A1 | 4/2006 | Frederick et al. |
| 2007/0194944 | A1* | 8/2007 | Galera ............... F16P 3/14 340/686.6 |
| 2008/0018472 | A1 | 1/2008 | Dasilva et al. |
| 2008/0137589 | A1 | 6/2008 | Barrett |
| 2011/0260847 | A1 | 10/2011 | Leppanen et al. |
| 2011/0273293 | A1 | 11/2011 | Itkin et al. |
| 2011/0279261 | A1 | 11/2011 | Gauger et al. |
| 2011/0298579 | A1* | 12/2011 | Hardegger ............ F16P 3/14 340/3.1 |
| 2012/0025964 | A1 | 2/2012 | Beggs et al. |

* cited by examiner

PROXIMITY DETECTION SYSTEMS AND METHODS

RELATED APPLICATIONS

This application is a continuation of U.S. application Ser. No. 14/473,297, filed Aug. 29, 2014, now U.S. Patent No. 9,404,363, which claims priority to U.S. Provisional Application No. 61/872,293, filed Aug. 30, 2013, the entire content of both applications is hereby incorporated by reference.

BACKGROUND

Embodiments of the present invention relate to methods and systems for monitoring the location of personnel and equipment, such as underground mining equipment.

SUMMARY

One purpose of a proximity detection system is to prevent collisions between equipment and personnel. Existing proximity detection systems only identify a "hazard" zone around a piece of equipment (e.g., either a software zone or a physically measureable zone). The proximity detection system can be installed on the piece of equipment, and, if personnel is detected within the "hazard" zone, the system can be configured to take various automatic actions, such as issuing a warning (e.g., visually and/or audibly) or stopping operation of the piece of equipment. Personnel can be detected by the proximity detection system using a personal wearable device ("PWD") worn by personnel.

Embodiments of the invention improve the reliability and detection of a proximity detection system to improve safety of equipment, such as mining equipment. In particular, embodiments of the invention apply a "stop" zone around each detected personnel. The stop zone has characteristics relating to the movement of the detected personnel. Using the individual stop zones to detect personnel around a piece of equipment while providing minimal impact to productivity. For example, by predicting a travel path of personnel relative to a particular piece of equipment, equipment functionality can either be interrupted earlier (e.g., if the personnel is heading toward the equipment) or allowed to continue without interruption (e.g., if the personnel is heading away from the equipment).

In particular, one embodiment of the invention provides a proximity detection system. The proximity detection system includes a controller for executing instructions stored in non-transitory computer-readable medium. The instructions, when executed, detect a location of an object based on detection of a PWD attached to the object, define a zone around the detected object based on a velocity of the detected object with respect to equipment, and automatically issue a warning and/or interrupt operation of the equipment if the defined zone overlaps with a position or location of the equipment. In some embodiments, the zone is also defined based on predetermined dimensions of the object. The zone can also be separated into a warning zone and a stop zone. If the warning zone overlaps with the location of the equipment, the instructions can issue a warning, and, if the stop zone overlaps with the location of the equipment, the instructions can stop operation of the equipment. In some embodiments, one or more zones are also defined around the equipment and the instructions detect when the zone defined for the detected objects overlaps with one of the zones defined for the equipment.

In another embodiment, the invention provide a proximity detection system at least one processor. The processor configured to detect a location of an object; determine a velocity of the object; define a zone around the object based on the location and the velocity; and automatically perform at least one action if the zone around the object overlaps with a location of a piece of equipment.

In yet another embodiment, the invention provides a method for detecting objects located around a piece of equipment. The method including detecting a location of an object; determining a velocity of the object; defining, with at least one processor, a zone around the object based on the location and the velocity; and automatically performing at least one action if the zone around the object overlaps with a location of the piece of equipment.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, the methods, operations, and sequences described herein can be performed in various orders. Therefore, unless otherwise indicated herein, no required order is to be implied from the order in which elements, steps, or limitations are presented in the detailed description or claims of the present application. Also unless otherwise indicated herein, the method and process steps described herein can be combined into fewer steps or separated into additional steps.

In addition, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "controllers" described in the specification can include one or more processors, one or more non-transitory computer-readable medium modules, one or more input/output interfaces, and various connections (e.g., a system bus) connecting the components.

Figure 1:
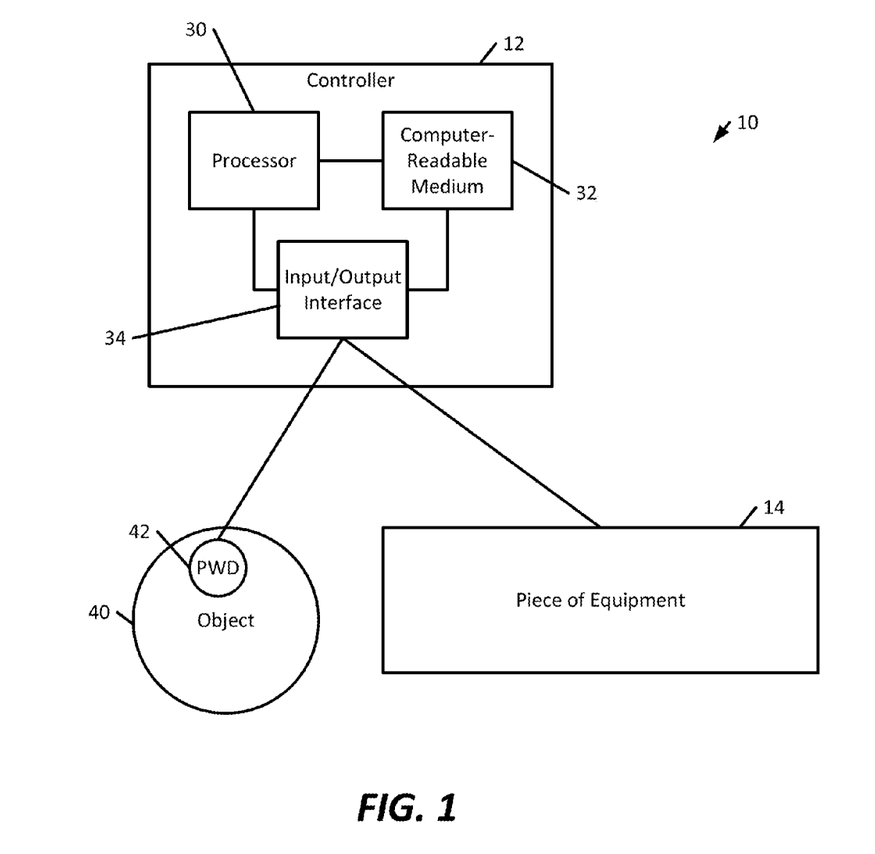
FIG. 1 schematically illustrates a proximity detection system.

FIG. 1 illustrates a proximity detection system 10. The system 10 includes at least one controller 12 and at least one piece of equipment 14. As illustrated in FIG. 1, the controller 12 includes a processor 30 (e.g., a microprocessor), non-transitory computer-readable medium 32, and an input/output interface 34. The computer-readable medium 32 can include random access memory ("RAM") and/or read-only memory ("ROM"). The input/output interface 34 transmits and receives data from devices external to the controller 12 (e.g., over a wired or wireless connection). For example, as illustrated in FIG. 1, the controller 12 can be configured to communicate with the piece of equipment 14. For example, the controller 12 can be configured to transmit signals to the piece of equipment 14 that cause the piece of equipment to issue an warning (e.g., turn on a warning light and/or an audible warning tone) and/or modify operation (e.g., slow down, stop, or shutdown). As discussed in more detail within, the piece of equipment 14 may be a mining machine, such as but not limited to, a continuous miner, a shuttle car, a loader, a truck, a utility vehicle, a shovel, a dragline, and a bulldozer.

The controller 12 can also be configured to communicate with an object 40 located around the piece of equipment 14. For example, in some embodiments, the object 40 is personnel wearing a personal wearable device ("PWD") 42 that transmits data to the controller 12 representing a location of the object 40. Accordingly, as described in more detail below, the controller 12 can use data obtained from the PWD 42 to determine a location of an object 40 and the velocity (i.e., speed and direction of travel) of the object 40 (e.g., tracking a location of an object 40 over a period of time). It should be understood that in some embodiments, rather than receiving data from a PWD 42 coupled to an object 40, the controller 12 uses other methods to detect an object, including but not limited to imaging, radar, ultrasound, laser-scanning, etc. Accordingly, in these situations, an object 40 may not include a device that communicates with the controller 12.

The processor 30 included in the controller 12 receives data (e.g., from the medium 32 and/or the input/output interface 34) and processes the data by executing one or more instructions or modules. The instructions or modules are stored in the computer-readable medium 32. The processor 30 also stores data (e.g., data received through the input/output interface 34 and/or generated by instructions or modules executed by the processor 30) to the medium 32. It should be understood that although only a single processor, input/output interface, and computer-readable medium module are illustrated in FIG. 1, the controller 12 can include multiple processors, memory modules, and/or input/output interfaces. It should also be understood that the functionality performed by the controller 12 as described in the present application can be distributed over multiple controllers, and the controller 12 can be configured to perform additional functionality not described in the present application. Furthermore, it should be understood that in some embodiments, the controller 12 is located remote from the piece of equipment 14. However, in other embodiments, the controller 12 is included in the piece of equipment 14.

The instructions stored in the computer-readable medium 32 provide particular functionality when executed by the processor 30. In general, the instructions, when executed by the processor 30, perform the method 50 illustrated in FIG. 2. The method 50 includes detecting an object 40 around a piece of equipment 14 (at block 52). In some embodiments, the controller 12 is configured to detect objects within one or more spaces associated with a piece of equipment 14 (e.g., within a predetermined distance from a location of the piece of equipment 14). Accordingly, the controller 12 can use a location, area, and/or volume of the piece of equipment 14 to determine a space in which to detect objects.

As noted above, in some embodiments, PWDs 42 are worn or coupled to personnel and the controller 12 receives data from the PWDs 42 that represents the location of the PWDs 42. PWDs are known in the industry and therefore additional details regarding the devices are not provided herein. However, as noted above, it should be understood that in addition to or as an alternative to using the PWDs 42, the controller 12 can use other methods to detect the location of an object 40 (e.g., imaging, radar, ultrasound, laser-scanning, etc.).

Figure 2:
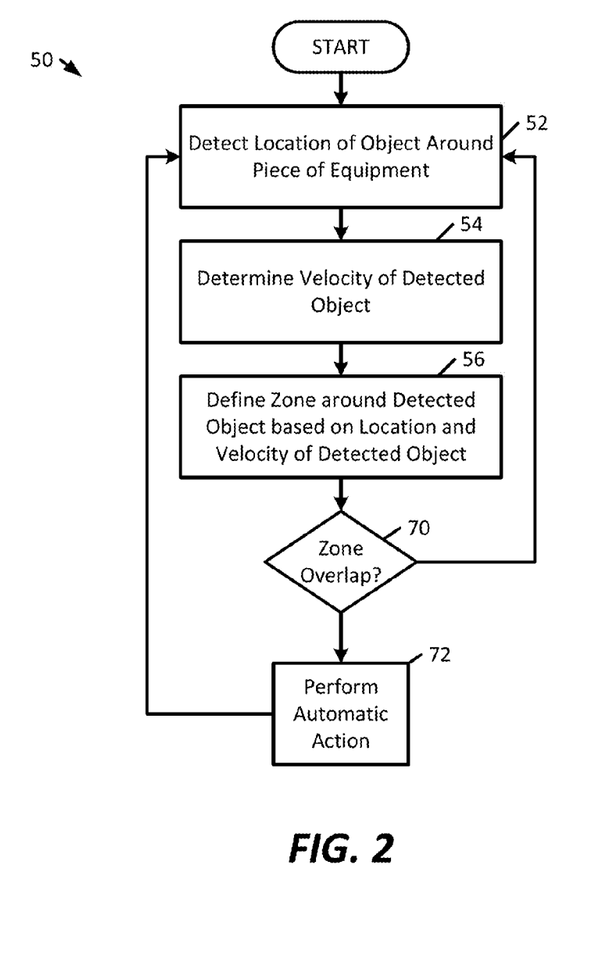
FIG. 2 is a flowchart illustrating a method performed by the proximity detection system of FIG. 1.

After detecting an object 40, the controller 12 determines a velocity of the object 40 (e.g., a speed and direction of travel) (at block 54). In some embodiments, the velocity of the object 40 is determined as a relative velocity of the object 40 with reference to the piece of equipment 14. The controller 12 can determine the velocity of the object 40 by tracking the location of the object 40 over a period of time.

After determining the velocity, the controller 12 defines at least one zone around the detected object 40 (at block 56). The zone is spaced in at least two-dimensions that are based on the location of the detected object 40 and the velocity of the object 40. In some embodiments, when defining a zone for an object, the controller 12 is configured to treat a detected object 40 as a dimensional body. For example, the controller 12 can map the identification of an object (e.g., a PWD 42) to an area approximating the physical dimensions of the object (e.g., a person), which provides a more realistic detection of the object 40 than if the object 40 were mapped to a single coordinate. Accordingly, when defining a zone around an object, the zone can include an area (or a volume) representing the detected object 40 itself.

In some embodiments, the controller 12 applies a semi-continuous function (e.g., composed of several piecewise functions) to define a zone around an object 40. The controller 12 can dynamically adjust the zone for an object 40 using variables based upon one or more conditions (e.g., internal to the system 10 and/or external to the system 10). For example, in one embodiment of the invention, the controller 12 generates a zone in software around a detected object 40 at the object's current location having default dimensions of a circle with a radius "r." The radius "r" can be individually defined for particular objects 40 (e.g., types of objects, PWD serial numbers, PWD identification type, etc.).

In some embodiments, the controller 12 generates a zone in software around each detected object 40. In some embodiments, a zone created for an object 40 is defined for a particular piece of equipment 14. Therefore, if the object 40 is located around more than one piece of equipment 14, the controller 12 can generate and independently maintain a zone around the object 40 associated with piece of equipment 14. Accordingly, multiple simultaneous zones can exist for a single object 40 (e.g., at least one for each piece of equipment 14 that a detected object is within range of).

Each zone defined for an object 40 can also be associated with a preset list of coordinate offsets. One or more of the offsets can be fixed offsets. One or more of the offsets can be variable based on one or more factors, including but not limited to the relative velocity of the object 40 with respect to the equipment 14. Adjusting the default zone based on the relative velocity of the object 40 with respect to the piece of equipment 14 allows the proximity detection system 10 to trip based upon the movement of objects 40 and not just their location at a particular instant in time. For example, as described in more detail below, if an object 40 is moving parallel to or on a non-collision course with a piece of equipment 14, the controller 12 can be configured to allow the piece of equipment 14 to continue operation without interruption. However, if an object 40 is on a collision course with a piece of equipment 14, the controller 12 takes one or more automatic actions to modify operation of the piece of equipment 14 at a distance that is proportional to the object's velocity relative to the piece of equipment 14.

For example, the controller 12 can use equations [1] and [2] below to define a zone around an object 40. The parametric forms of the equations are provided below. In some embodiments, the equations can be converted to Cartesian format, which may be easier to compute.

[1] for $t < |\pi/2|$:

$$x = [r^*\cos(t) + V|\cos(t)|]^*\cos(\theta) - [r^*\sin(t) + V^*w^*\sin(t)]^*\sin(\theta) + x_0$$

$$y = [r^*\cos(t) + V|\cos(t)|]^*\sin(\theta) + [r^*\sin(t) + V^*w^*\sin(t)]^*\cos(\theta) + y_0$$

[2] for $\pi/2 < t < 3\pi/2$:

$$x = r^*\cos(t)^*\cos(\theta) - r^*\sin(t)^*\sin(\theta) + x_0$$

$$y = r^*\cos(t)^*\sin(\theta) + r^*\sin(t)^*\cos(\theta) + y_0$$

Wherein:
r=radius of general error factor (can be a user or system adjustable parameter)
n=number of periods used for velocity vector moving average (can be a user or system adjustable parameter)
t (ranges from 0 to $2\pi$ or 0° to 360°)=angle of the zone around the object with respect to the origin (an angle of 0, or 0°, from the object). The distance of the object's zone from the center of the PWD is identified for that particular angle from the object ("t" is unique to the parametric form).
$X_{position\ array}(X_0, X_1, \ldots x_n)$=array of the most recent "n" x coordinates of the object
$y_{position\ array}(y_0, y_1, \ldots y_n)$=array of the most recent "n" y coordinates of the object
T $(T_{01}, T_{12}, \ldots T_{n-1\ n})$=array of the most recent time periods between object coordinates
$V_x([(x_0-x_1)/T_{01}+(x_1-x_2)/T_{12}+ \ldots +(x_{n-1}-x_n)/T_{n-1\ n}]/n)$=x-component of object's velocity vector
$V_y([(y_0-y_1)/T_{01}+(y_1-y_2)/T_{12}+ \ldots +(y_{n-1}-y_n)/T_{n-1\ n}]/n)$=y-component of object's velocity vector
w=width adjustment coefficient of projected zone (can be a user or system adjustable parameter)
k=velocity adjustment coefficient (can be a user or system adjustable parameter) V $(k^*[(V_x^2+V_y^2)^{1/2}])$=object velocity vector magnitude
$\theta=\tan^{-1}(V_x/V_y)$, when $\tan^{-1}(V_x/V_y)$ is not defined
$\theta=0$ to the angle of the object's velocity vector The equations provide for an adjustable component in the x direction and the y direction. In the x direction, the zone can be expanded relative to the magnitude of the object's velocity (e.g., a magnitude of a total velocity vector for an object 40). In the y direction, the zone is widened by a proportional amount related to the magnitude of the vector and the parameter selection for "w" (see below). The equation then rotates the expanded circle (in the x and y direction) such that the primary expansion is in the direction of the object's velocity. It should be understood that a scaled component can be included for the x and/or y coordinates to widen the projected zone if the accuracy of a detected location of an object 40 is questionable. Also, in some embodiments, the controller 12 can define a fixed zone around an object 40 when the controller 12 does not know the location of a detected object with high degree of accuracy. For example, in some embodiments, if a detected object is more than 40 feet from a piece of equipment 14, the controller 12 can be configured to provide a fixed zone (i.e., a zone not adjusted for the detected object's velocity). In particular, when the location of a detected object 40 is not as accurately known or when the resolution of an object's location is poor (such as further than 40 feet from the piece of equipment 14 and/or the proximity detection system 10), the controller 12 can use the parameter "r" as a general error factor and can set the zone around the object 40 equal to approximately the known error range of detection of that object 40. In these situations, the controller 12 can still perform velocity-based adjustments, but the adjustments may not have meaningful gains in system performance or stability.

Figure 3A:
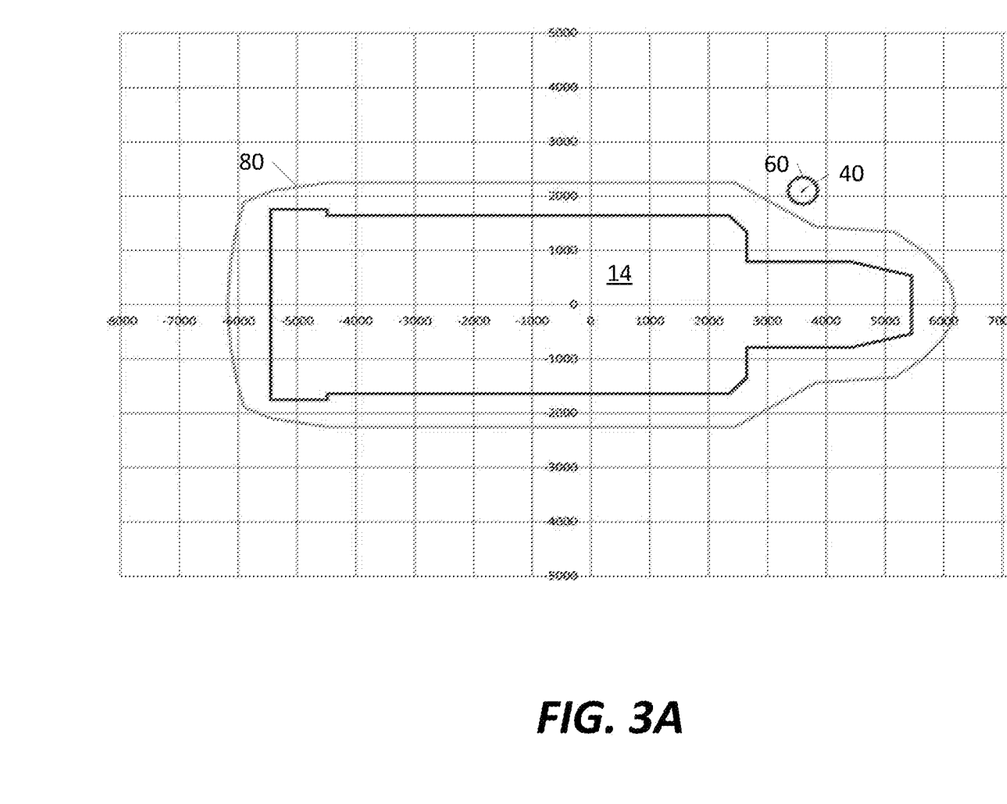
FIGS. 3A-C schematically illustrate zones defined for an object by the proximity detection system of FIG. 1.
Figure 3B:
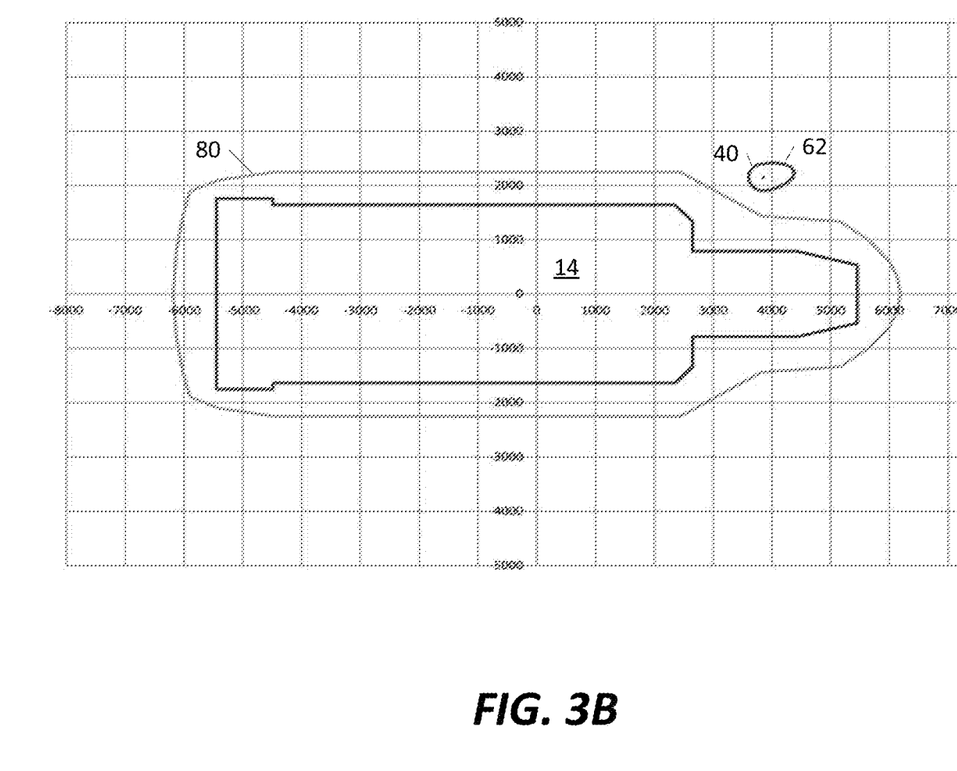
Figure 3C:
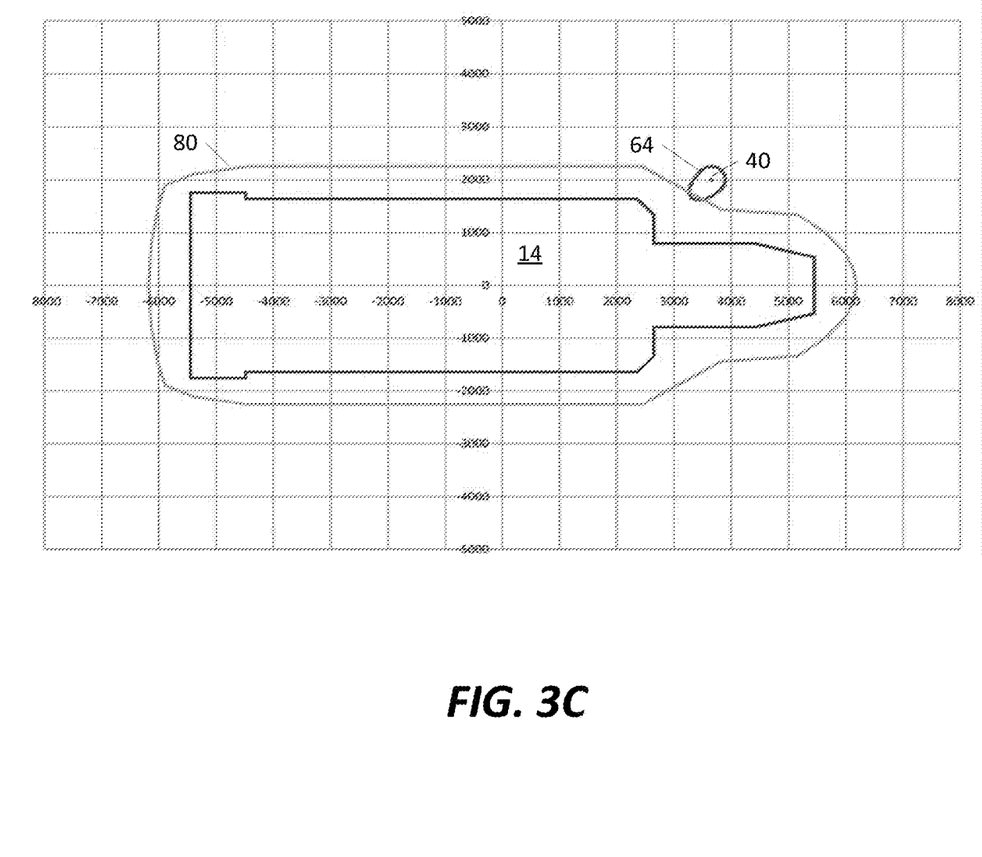

FIG. 3A illustrates a zone 60 defined around a detected object 40 when the object 40 is stationary. Similarly, FIG. 3B illustrates a zone 62 defined around a detected object 40 when the object 40 is moving away from a piece of equipment 14 (i.e., toward the right of the paper) and FIG. 3C illustrates a zone 64 defined around a detected object 40 when the object is moving toward a piece of equipment 14. As illustrated in FIGS. 3B and 3C, when a detected object 40 is moving, the zone created by the controller 12 using the above equations extend a first distance in a direction of the object's velocity and extends a second distance opposite the direction of the object's velocity, wherein the first distance is greater than the second distance. By creating a zone that projects in the direction of a detected object's movement, the proximity detection system 10 can trip automatic actions sooner than if the zone did not take into consideration the direction and magnitude of the object's movement (e.g., see FIG. 3A).

With regard to the equations set forth above, an object's total velocity vector is defined as an n-period moving average of the individual iterative velocity vectors for the object 40 relative to a piece of equipment 14. The period over which these individual vectors are obtained is defined as parameter "n." To obtain the total velocity vector, the controller 12 obtains the current position of the object 40 with respect to the piece of equipment 14 (x0,y0), "n-1" previous positions of the object 40 with respect to the piece of equipment 14 [(x1,y1), (x2,y2) . . . (xn,yn)], and the time "T" between each of these readings. The components of the total velocity vector are Vx and Vy. From these components, the controller 12 derives a magnitude V and an angle $\theta$.

Accordingly, using the above equations, the controller 12 uses the speed and direction of travel of a detected object 40 to approximate the next position of the object 40. As described in more detail below, the controller 12 uses the approximated position of the object 40 to define a zone for the object 40 that allows the object 40 to get closer to a piece of equipment 14 (e.g., without interrupting operation of the equipment 14) when the object 40 is on a non-collision course with the equipment 14. Similarly, when the zone defined for the object 40 indicates that the object 40 is on a collision course with the equipment 14, the controller 12 can take an automatic action at an appropriate point in time to provide for highly repeatable stopping distances between a detected object 40 and a piece of equipment regardless of how fast the equipment 14 and/or the object 40 is moving.

Returning to FIG. 2, after defining a zone for an object, the controller 12 compares the zone for the object with a location of the piece of equipment 14. If the zone for the object overlaps with the location of the piece of equipment 14 (at block 70), the controller 12 performs one or more automatic actions (at block 72). As noted above, the automatic actions can include issuing a warning (e.g., a visual and/or audible warning) and/or modifying operation of the piece of equipment 14 (e.g., stopping the equipment 14).

In some embodiments, the controller 12 also defines a zone for the piece of equipment 14. For example, as illustrated in FIGS. 3A-3C, the piece of equipment 14 can be associated with a zone 80. Accordingly, the controller 12 can determine (at block 70) whether the zone defined for the object 40 overlaps with the zone defined for the piece of equipment 14 (see, e.g., FIG. 3C). In some embodiments, by adjusting the zone defined for the object 40 as defined above (i.e., based on the object's velocity), the zone for the piece of equipment 14 can be smaller than if the zone for the object 40 were not adjusted. Furthermore, it should be understood that in some embodiments, the controller 12 can adjust the zone for the piece of equipment 14 based on a velocity of the piece of equipment 14 as described above for the object. For example, a portion of a zone defined around the equipment 14 can be made smaller in a direction opposite to movement of the equipment 14, which allows objects 40 (e.g., personnel) to approach closer to the equipment 14 in that direction (i.e., when the equipment 14 is moving away from the object 40).

It should be understood, however, that adjusting the zone around a detected object 40 may be simpler than adjusting a zone around a piece of equipment 14. For example, equipment zones commonly have many minor variations and subtleties that make them difficult to project accurately. For example, the physical shape of a piece of equipment 14 and the ability for different portions of the equipment 14 to move in different directions and/or pose different risks, makes adjusting a zone for a piece of equipment 14 more complex than performing the same adjustment for an object 40, such as personnel, located around the equipment 14. For example, determining a zone for a detected object 40 can be performed after each object's location is obtained, which limits the amount of processing power needed. Furthermore, these determinations can be performed every other period if sufficient processing power is unavailable. Given the fact that detected objects 40, such as personnel, may move at slower speeds than some equipment 14, determining a zone less frequently may not necessarily impact the accuracy and reliability of the proximity detection system 10. Also, as noted above, in some embodiments, using adjusted zones for objects 40 around a piece of equipment 14, allows the zone for the equipment 14 to be smaller and easier to compute and track.

In some embodiments, the controller 12 can be configured to create a plurality of zones for an object 40 and/or a piece of equipment 14. For example, the controller 12 can use weighted impacts of velocities to define a warning zone, a slowdown zone, and a shutdown zone for an object 40 and/or a piece of equipment 14. The controller 12 can determine these zones using a fuzzy logic-like perspective. For example, a zone around an object 40 can be given a weight factor of 0 to 1. Similarly, the zone around a piece of equipment 14 can be weighted using another weight factor of 0 to 1. The controller 12 can then multiply the weight factors together to determine a particular automatic action to take. For example, if the result of the multiplication is between 0 and 0.1, the controller 12 can take no action. If the result of the multiplication is between 0.1 and 0.2, the controller 12 can generate a warning. If the result of the multiplication is between 0.3 and 0.5, the controller 12 can initiate a slow down of the piece of equipment 14. If the result of the multiplication is between 0.5 and 1.0, the controller 12 can stop the piece of equipment 14.

Also, in some embodiments, different weights can be applied to different portions of a zone. Accordingly, the controller 12 can use the overlapping portions of the zone around an object 40 and the zone around a piece of equipment 14 to determine what weight factors are used to determine what action(s) are taken by the controller 12. For example, a base zone could be assigned a weight of 1 and different portions of the zone (e.g., different directionally projected portions of the zone) could be assigned different weight factors. For example, a first 50% of a projected portion of the zone from the base zone could be assigned a weight of 0.9, the next 30% could be assigned a weight of 0.5, and the remaining 20% (the furthest part of the adjusted zone) could be assigned a weight of 0.3. Accordingly, the controller 12 can be configured to take a first action (e.g., issue a warning) when the overlapping portion of a zone includes a first portion of the zone and take a second action when the overlapping portion of the zone includes a second portion (e.g., stop the equipment 14).

It should be understood that an object's zone can be verified based on the type of equipment 14. For example, for remote controlled equipment 14 (e.g., a continuous miner), the controller 12 can define a zone for the object that varies with the operation of the equipment 14, such as the starting of cutters. Also, if an object is identified as having a particular role or task (e.g., operator), the object's zone can be adjusted accordingly. For example, as an operator of a piece of equipment 14 is likely to get closer to the equipment 14 than other personnel, the operator's zone can be smaller than zones for non-operators.

It should be understood that the proximity detection system 10 described above can be used in many different situations with different types of equipment 14, objects 40, environments, etc. Therefore, the proximity detection system 10 can be configured to take into account additional factors than those described above and the numeric values provided above are provided as one example and different values can be used based on the specific conditions under which the proximity detection system 10 is used.

It should be understood that the piece of equipment 14 can include any device or collection of devices, including mining machines. For example, as one example, the proximity detection system 10 can be used with a continuous miner to detect and track the location of an operator of the miner. In particular, an operator of a continuous miner typically stands directly behind the continuous miner to tram the miner forward. When the operator needs to turn the miner into a cross cut to the left, the operator wants to be as close as possible to the miner on the right side to see where the miner is going and see the position of cables. If the operator moves forward at the same speed as (or less than) the speed of the miner, the zone defined for the operator will not be extended toward the miner, which allows the operator to get as close as possible to the miner (e.g., within approximately 3 feet).

However, if the operator stands in front of the miner while turning the same cut, the controller 12 can stop the miner as the miner moves toward the operator. Accordingly, in this situation, the operator may not be able to get as close to the miner while the miner is still moving (e.g., within approximately 3 feet of the miner) as the operator would if the operator were walking with the miner (i.e., moving in the same direction of the miner rather than in an opposite direction representing a potential collision course).

Similarly, the proximity detection system 10 described above can be used with a shuttle car ("SC") travelling down an entry. For example, even with a directionally projected zone around the SC, an object 40 (e.g., a person) standing in a crosscut could cause the proximity detection system on the SC to trip (i.e., perform one or more automatic actions) as the SC is moving down the entry. However, if a detected object 40 in the crosscut is assigned a directionally projected zone based on the object's velocity, the zone for the SC can be reduced. Furthermore, when the velocity of the object 40 and the SC indicate a non-collision course (e.g., indicates a parallel path), the zones prevent a nuisance trip of the proximity system, which is a common complaint for existing proximity systems on SCs.

As yet another example, the proximity detection system 10 described above can be used with a continuous miner operating with one or more SCs. For example, when a SC pulls up to a continuous miner, the operator of the miner would likely be within range of the proximity detection system of both the SC and the miner. In this situation, both pieces of equipment need to move without striking the operator. In particular, both pieces of equipment would need to move at slow speeds forward. When the miner moves forward, the miner moves away from the operator, meaning that there would be little to no chance of the miner striking the operator. However, when the SC moves forward, there is some risk of striking the operator. Accordingly, without using an adjustable zone for the operator, it would be difficult for the SC to move closer to the miner without tripping its proximity detection system. Furthermore, even if projected zones are used for the SC, the zones still cover a large area in front of the SC, which make it difficult for the operator to find a place where he is outside of both the zones of the miner and the SC. Using an adjusted zone for the operator, however, allows both the SC and the miner to maintain a small zone (as they are both moving slowly). Furthermore, if the operator is standing or moving to the side of the SC, the operator's presence will not trip the proximity detection system for the SC (i.e., the zone defined for the operator will not overlap with the zone defined for the SC because the velocity of the operator and the SC do not represent a collision course).

Thus, embodiments of the invention provide systems and methods for detecting objects located around equipment and defining at least one zone for the detected object based on the object's velocity (e.g., relative to the equipment). The methods and systems improve reliability and detection of objects around a piece of equipment, such as personnel. In addition, the system and method improves equipment operation by predicting the paths of moving objects relative to the equipment and interrupting equipment functionality accordingly. The systems and methods can use PWDs, which allows the systems and methods to use existing detection technologies. It should be understood that the "objects" described herein can include human personnel and/or other objects that move relative to a piece of equipment (e.g., other pieces of equipment). Therefore, the methods and systems described herein for defining at least one zone around a detected object can be used with any type of movable object located around the equipment.

Various features and advantages of the invention are set forth in the following claims.

What is claimed is:

1. A proximity detection system comprising:
at least one processor configured to
define a first virtual zone around a piece of equipment,
determine a location of a person,
define a second virtual zone around the person at the location, and
as the location of the person changes,
determine a velocity of the person, the velocity including a direction of travel of the person and a magnitude of the direction of travel of the person,
automatically modify the second virtual zone to extend a first distance in the direction of travel of the person and extend in a second distance opposite the direction of travel of the person, wherein the first distance is greater than the second distance to project the second virtual zone based on the direction of travel of the person and the magnitude of the direction of the travel of the person,
compare the first virtual zone and the second virtual zone, and
in response to at least a portion of the second virtual zone overlapping with at least a portion of the first virtual zone, perform at least one action.

2. The proximity detection system of claim 1, wherein the magnitude of the direction of travel of the person includes a speed of the person.

3. The proximity detection system of claim 2, wherein the at least one processor is further configured to automatically modify the second virtual zone to extend the first distance in the direction of travel of the person based on the speed of the person.

4. The proximity detection system of claim 1, wherein the at least one processor is configured to detect the location of the person based on a signal received from a device coupled to the person.

5. The proximity detection system of claim 4, wherein the device includes a wearable device worn by the person.

6. The proximity detection system of claim 1, wherein the at least one processor is configured to determine the direction of travel of the person by tracking the location of the person over a period of time.

7. The proximity detection system of claim 1, wherein the first virtual zone includes a first sub-zone and a second sub-zone and wherein the at least one processor is configured to perform the at least one action by performing a first action when at least the portion of the second virtual zone overlaps with at least a portion of the first sub-zone of the first virtual zone and performing a second action when at least the portion of the second virtual zone overlaps with at least a portion of the second sub-zone of the first virtual zone, wherein the first action is different than the second action.

8. The proximity detection system of claim 1, wherein the at least one action includes at least one selected from a group consisting of issuing a warning and modifying operation of the piece of equipment.

9. The proximity detection system of claim 1, wherein the second virtual zone includes a first sub-zone and a second sub-zone and wherein the at least one processor is configured to perform the at least one action by performing a first action when at least a portion of the first sub-zone of the second virtual zone overlaps with at least a portion of the first virtual zone and perform a second action when the second sub-zone of the second virtual zone overlaps with at least a portion of the first virtual zone, wherein the first action is different than the second action.

10. The proximity detection system of claim 1, wherein the at least one processor is configured to define the first virtual zone based on at least one selected from a group consisting of a location of the piece of equipment, a speed of the piece of equipment, and a direction of travel of the piece of equipment.

11. The proximity detection system of claim 1, wherein the at least one processor is further configured to determine a first weight factor associated with the portion of the second virtual zone overlapping with the portion of the first virtual zone and determine the at least one action based on the first weight factor.

12. The proximity detection system of claim 11, wherein the at least one processor is further configured to determine a second weight factor associated with the portion of the first virtual zone overlapping with the portion of the second virtual zone and determine the at least one action based on a result of multiplying the first weight factor and the second weight factor.

13. A method for detecting at least one person located around a piece of equipment, the method comprising:
   determining a first virtual zone around the piece of equipment,
   determining a location of the person,
   defining, with at least one processor, a second virtual zone around the person, and
   as the location of the person changes,
      determining a velocity of the person including a direction of travel of the person and a magnitude of the direction of travel of the person,
      automatically modifying the second virtual zone to extend a first distance in the direction of travel of the person and extend in a second distance opposite the direction of travel of the person, wherein the first distance is greater than the second distance to project the second virtual zone based on the direction of travel of the person and the magnitude of the direction of the travel of the person,
      comparing the first virtual zone and the second virtual zone, and
      in response to at least a portion of the second virtual zone overlapping with at least a portion of the first virtual zone, performing at least one action.

14. The method of claim 13, wherein determining the velocity of the person includes determining the direction of travel of the person and a speed of the person.

15. The method of claim 14, further comprising automatically modifying the second virtual zone to extend the first direction in the direction of travel of the person based on the speed of the person.

16. The method of claim 13, further comprising defining a first sub-zone and a second sub-zone for the first virtual zone and wherein performing the at least one action includes performing a first action when at least the portion of the second virtual zone overlaps with at least a portion of the first sub-zone of the first virtual zone and performing a second action when at least the portion of the second virtual zone overlaps with at least a portion of the second sub-zone of the first virtual zone, wherein the first action is different than the second action.

17. The method of claim 13, further comprising defining a first sub-zone and a second sub-zone of the second virtual zone and wherein performing the at least one action includes performing a first action when at least a portion of the first sub-zone of the second virtual zone overlaps with at least a portion of the first virtual zone and performing a second action when the second sub-zone of the second virtual zone overlaps with at least a portion of the first virtual zone, wherein the first action is different than the second action.

18. The method of claim 13, further comprising:
   determining a first weight factor associated with the portion of the second virtual zone overlapping with the portion of the first virtual zone; and
   determining the at least one action based on the first weight factor.

19. The method of claim 18, further comprising:
   determining a second weight factor associated with the portion of the first virtual zone overlapping with the portion of the second virtual zone; and
   determining the at least one action based on a result of multiplying the first weight factor and the second weight factor.

20. Non-transitory computer-readable medium including instructions that, when executed by a processor, cause the processor unit to perform a set of functions, the set of functions comprising:
   determining a first virtual zone around a piece of equipment,
   determining a location of a person,
   defining, with at least one processor, a second virtual zone around the person, and as the location of the person changes,
   determining a velocity of the person including a direction of travel of the person and a magnitude of the direction of travel of the person,
   automatically modifying the second virtual zone to extend a first distance in the direction of travel of the person and extend in a second distance opposite the direction of travel of the person, wherein the first distance is greater than the second di stance to project the second virtual zone based on the direction of travel of the person and the magnitude of the direction of the travel of the person,
   comparing the first virtual zone and the second virtual zone, and
   in response to at least a portion of the second virtual zone overlapping with at least a portion of the first virtual zone, performing at least one action.

* * * * *